United States Patent
Block et al.

(10) Patent No.: US 7,623,828 B2
(45) Date of Patent: Nov. 24, 2009

(54) MANAGING MASTER AND SLAVE DEVICES IN A COMMUNICATIONS NETWORK

(75) Inventors: Thomas Block, Wuppertal (DE); Christian Zechlin, Herne (DE)

(73) Assignee: Nokia Corporation, Espoo (FI)

( * ) Notice: Subject to any disclaimer, the term of this patent is extended or adjusted under 35 U.S.C. 154(b) by 437 days.

(21) Appl. No.: 11/275,614

(22) Filed: Jan. 19, 2006

(65) Prior Publication Data

US 2007/0173270 A1    Jul. 26, 2007

(51) Int. Cl.
*H04B 7/00* (2006.01)
(52) U.S. Cl. .................. 455/41.2; 455/517; 455/518; 455/519; 370/328; 370/338; 370/331
(58) Field of Classification Search ............... 455/41.2, 455/42, 517, 518, 519, 73; 370/328, 338, 370/331, 346, 349
See application file for complete search history.

(56) References Cited

U.S. PATENT DOCUMENTS

| | | | |
|---|---|---|---|
| 2002/0009158 A1* | 1/2002 | Souissi et al. | 375/295 |
| 2005/0122990 A1* | 6/2005 | Parys | 370/449 |
| 2006/0116075 A1* | 6/2006 | Gallo | 455/41.2 |
| 2007/0177567 A1* | 8/2007 | Parys | 370/346 |

* cited by examiner

*Primary Examiner*—Tuan A Pham
(74) *Attorney, Agent, or Firm*—Banner & Witcoff, Ltd (57) ABSTRACT

Systems and methods are provided for communication between master and slave devices on a network, such as a piconet or Bluetooth network. A master notifies the slave of a change in the link supervision timeout associated with the piconet. The slave stores the new link supervision timeout value and uses this value to control subsequent network-related operations, such as inquiry and paging procedures within a scatternet. The slave, aware of the link supervision timeout value for its existing connection may set an activity time limit for procedures in order to return to the physical channel of the piconet before a timeout connection loss to reestablish contact with the piconet master.

22 Claims, 6 Drawing Sheets

MANAGING MASTER AND SLAVE DEVICES IN A COMMUNICATIONS NETWORK

BACKGROUND

Bluetooth is a technical standard that facilitates communication between wireless devices such as mobile phones, personal digital assistants (PDAs), handheld computers, wireless enabled laptops, desktop computers, and various peripheral devices such as mice and keyboards. For example, Bluetooth-enabled wireless devices are capable of making phone calls, synchronizing data with desktop computers, sending and receiving faxes, and printing documents. Bluetooth technology is a low-power, short-range wireless technology commonly used to provide a replacement for the serial cable. Bluetooth can connect a wide range of personal, professional, and domestic devices together wirelessly, thus providing a fast, convenient way to exchange information over a short distance wireless network.

A piconet refers to a short-range wireless network used to connect devices enabled with Bluetooth, or a similar technology, in an ad hoc fashion. A piconet starts with two connected devices and may grow to a maximum size of typically eight connected devices. Piconet devices, such as Bluetooth-enabled devices, are peer units that have identical implementations with respect to communication over the piconet. However, when a piconet is established, one unit is designated the master device and one or more other devices are designated as slaves for the duration of the piconet connection. All devices on a piconet share the same physical channel for communications at a given time, which is defined by parameters unique to the master device, such as the master's network address. The master device uses its clock and hopping sequence to synchronize the slave devices in the piconet by transmitting to its slaves in time slots according to a predetermined polling interval, or at transmitting data to its slaves at other times determined by the master.

However, the master device and slave devices on a piconet may perform other tasks which interfere with the master-slave communication link in the piconet. For example, since a single Bluetooth-enabled device may be a member of multiple piconets, such a device may try to communicate with other Bluetooth-enabled devices and attempt to form or join additional piconets. During these attempts, devices commonly lose contact temporarily with the other devices in their existing piconet. A slave device that wishes to remove itself from a piconet may do so by simply ignoring the periodic communications sent by the piconet master device. When a slave device has been out of communication with its piconet master device for a predetermined length of time, the slave device may be actively disconnected from the master, and thus removed from the piconet. This predetermined length of time is often unknown to the slave hosts, resulting in many premature and undesirable slave detachments. Such undesirable detachments, or connection losses, may require the master and slave device subsequently to reconnect. This reconnection process is potentially time and resource consuming for the slave and master devices, and may degrade performance throughout the piconet.

Figure 1:
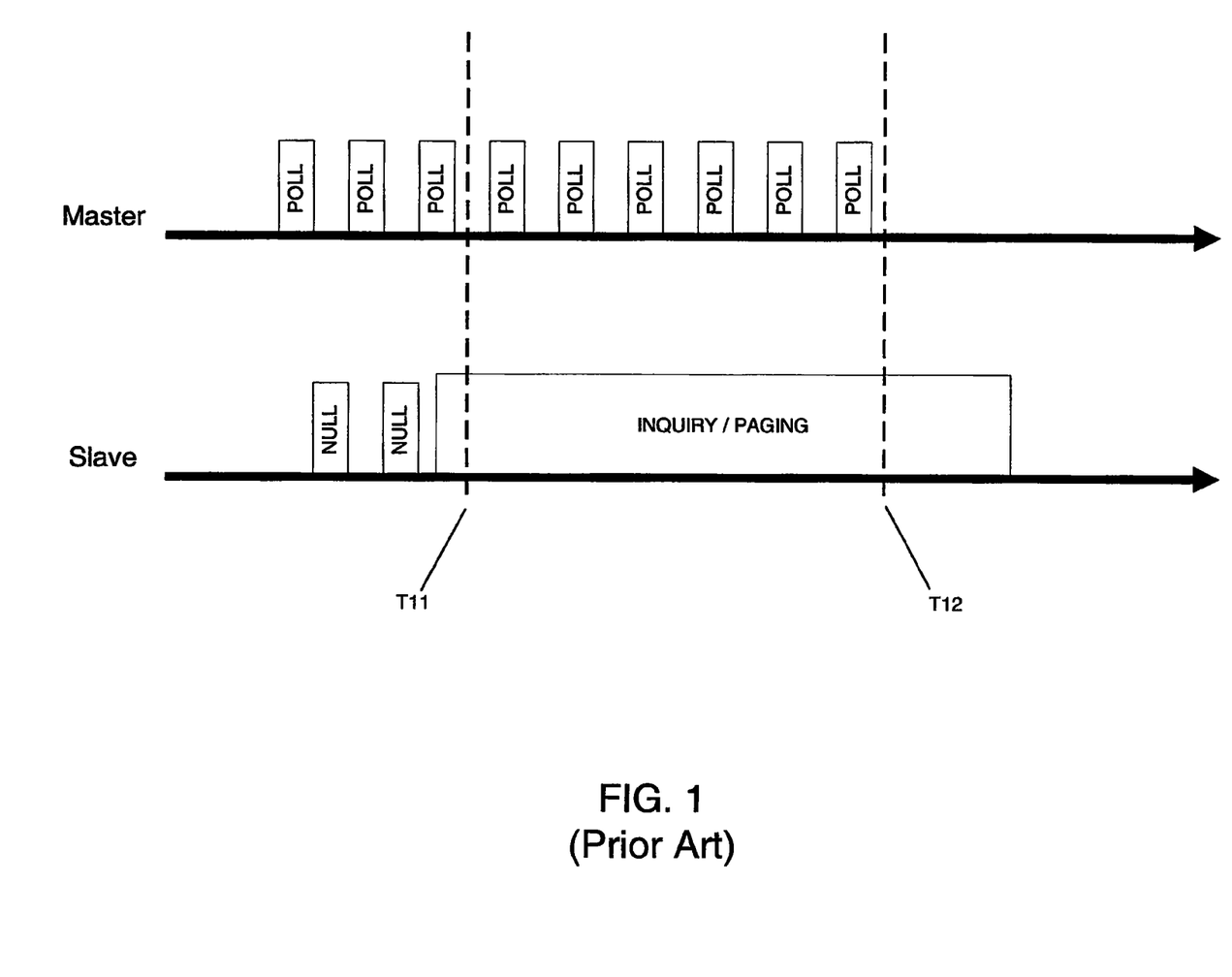
FIG. 1 is a block diagram of a conventional method of interaction between a master device and a slave device.

FIG. 1 is an example of a lost connection between a master and slave in a piconet. The horizontal lines represent the progression of time for a master and slave device in a piconet or similar network. In this example, the master device transmits periodic POLL packets to the slave, which responds with NULL packets sent back to the master. However, in FIG. 1, when the slave temporarily becomes out of contact with the master during an inquiry or paging procedure used to identify and connect to other devices, the master starts a timeout clock at time T11 to measure the length of time that the slave has been out of contact. If the slave is still out of contact when this timeout clock reaches a predetermined link supervision timeout value, the master may close the master-slave connection and thereby remove the slave from the piconet. In FIG. 1, while the slave is performing the inquiry/paging procedure, discussed in detail below, the slave host might not be aware of the link supervision timeout value, and thus does not know when it will be disconnected from the master. Further, the master may change this link supervision timeout value at any time, without the knowledge or consent of the slave hosts in the piconet. Such a change during the lifetime of a piconet further prevents the slave from adjusting its behavior to reduce the likelihood of timeout connections losses. Thus, in the example shown in FIG. 1, the slave does not reestablish contact with the master device and is subsequently disconnected from the piconet, at time T12, when the link supervision timeout period is reached. Accordingly, there remains a need for an improved method for managing communications between master and slave devices in a network.

SUMMARY

In light of the foregoing background, aspects of the present disclosure may potentially reduce timeout connection losses between master and slave devices in a piconet or similar network. According to one aspect of the present disclosure, a master device in a piconet may send a link supervision timeout value to a slave controller when a connection is established between the master and slave. The slave controller may use this value to control its subsequent activities and reduce the likelihood of undesirable timeout connection losses between the master and slave devices on the piconet. For example, a Bluetooth-enabled slave may participate in inquiry and paging activities with nearby Bluetooth devices, during which time the slave may be unable to communicate with its piconet master. With knowledge of the link supervision timeout value, the slave may shorten or partition these activities to reduce the likelihood of undesirable timeout connection losses.

According to another aspect of the present disclosure, a master device in a piconet may send updates to a slave controller when the link supervision timeout value changes. The slave controller may receive this new value, for example, in a link management protocol (LMP) message sent from the master controller. The slave controller may then relay this information to the slave host, for example, by sending a Host Controller Interface (HCI) event, which may be implemented as an extension of Bluetooth core functionality. The slave host may then store and rely on this link supervision timeout value when performing future network-related tasks, as a way of reducing the likelihood of undesirable lost connections between the master and slave.

According to yet another aspect of the present disclosure, a slave host may use the link supervision timeout value to create an activity time value that may be used for coordinating subsequent network-related activities. The activity time value may be related to, but shorter than, the link supervision timeout value, so that a subsequent activity performed by the slave device which interrupts the piconet master-slave polling may be suspended or terminated as needed, before the slave is timed-out and disconnected from the piconet. If needed, a longer network-related activity may be partitioned and executed in segments so that each segment is shorter than the link supervision timeout value. According to another aspect of the present disclosure, the slave controller may implement a shortening or partitioning of a network-related task without the knowledge of the slave host. For example, a Bluetooth module or Bluetooth application specific integrated circuit (ASIC) may receive a task from the slave host and impose its own activity time value for the task shorter than that specified by the slave host. Thus, according to some aspects of the present disclosure, unnecessary timeout connection losses may be reduced, potentially enhancing network performance and lowering operating costs.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF ILLUSTRATIVE EMBODIMENTS

Illustrative embodiments will now be described more fully with reference to the accompanying drawings. The embodiments set forth herein should not be viewed as limiting; rather, these embodiments are provided merely as examples of the concepts described herein.

Figure 2:
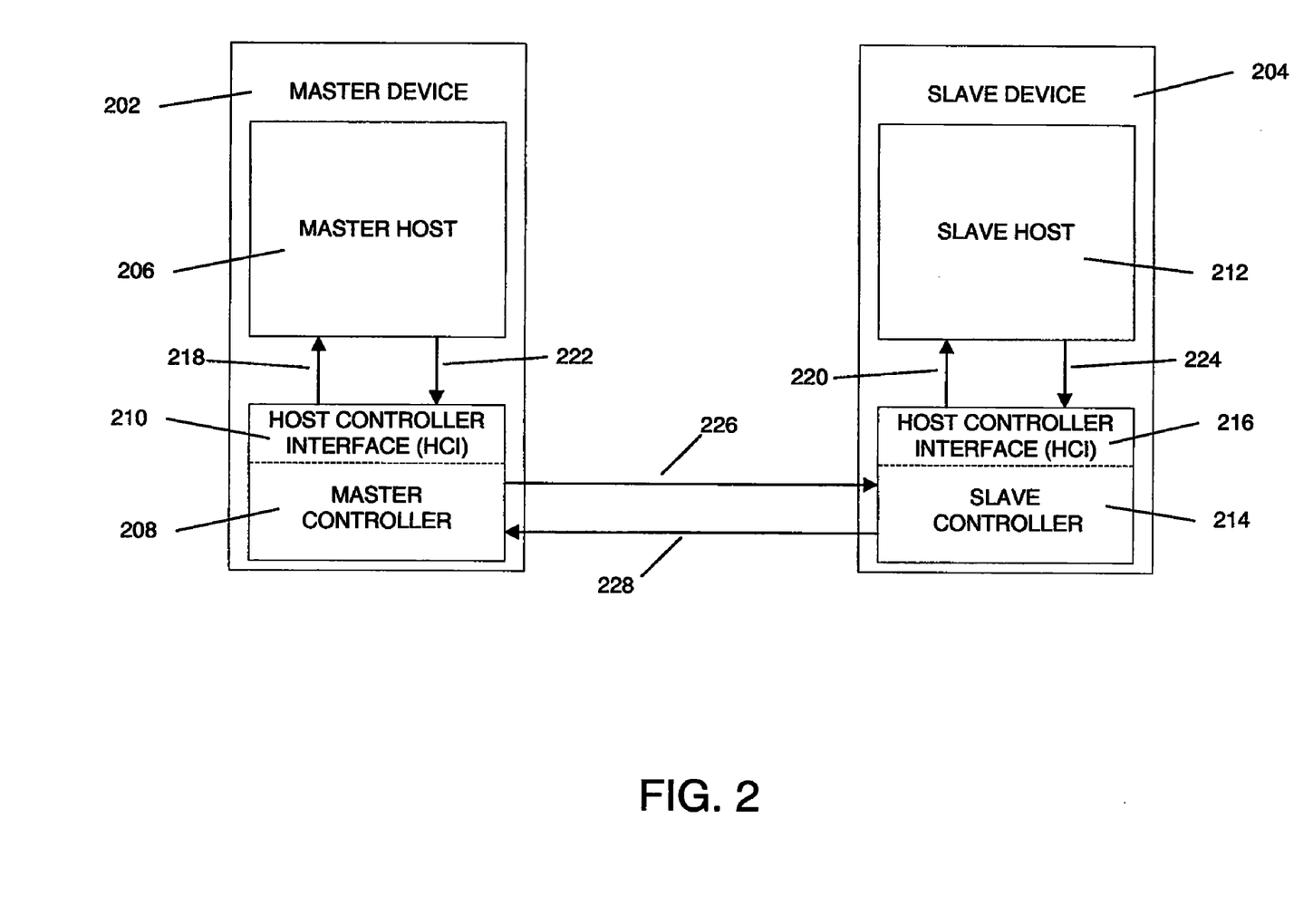
FIG. 2 is a block diagram showing an illustrative communication between a slave host and a slave controller, a master host and master controller, and between the master and slave devices, in accordance with an embodiment of the present disclosure.

Referring to FIG. 2, a block diagram is shown illustrating the communication within a master device 202 and a slave device 204 in a piconet, as well as the communication between these two devices, in accordance with certain illustrative embodiments. The master device 202 and slave device 204 may be, for example, Bluetooth-enable wireless devices, such as mobile phones or computing devices, as defined in the Bluetooth Core 2.0+EDR specification (the Bluetooth specification). The master device 202 includes a master host 206, and a master controller 208. A host controller interface (HCI) 210 may be part of the master controller, and may enable communication between the master host 202 and the master controller 208. Similarly, the slave device 204 may include a slave host 212, and a slave controller 214, which itself includes an HCI 216.

Note that the master host 206 and slave host 212 may be functional computing devices which may be attachable and detachable to their respective controllers 208 and 214. For example, the slave host 212 may be a functional mobile phone and the slave controller 214 may be a detachable Bluetooth module. In such an example, the slave host mobile phone 214 may be sold separately and may function properly as a mobile phone. Only when the device user decides to include this slave device 204 in a Bluetooth network would the user attach the Bluetooth module to act as the slave controller 214. In other examples, the controllers 208 and 214 may instead be built-in to the master and slave devices 202 and 204.

As is shown in FIG. 2, the HCI's 210 and 216 allow the controllers 208 and 214 to communicate with their respective hosts 206 and 212. Communications 218 and 220 from the controllers to the hosts may be implemented as HCI events. In contrast, the communications 222 and 224 from the hosts to the controllers may be implemented as HCI commands. The devices 202 and 204 may communicate with each other through their respective controllers 208 and 214. These communications 226 and 228 may be implemented as Link Management Protocol (LMP) messages.

The piconet described in this example may be a short-range wireless network, such as a Bluetooth network, including two or more Bluetooth-enabled devices which communicate over the same physical channel at any given time. The physical channel for communication among the piconet devices may change periodically. For example, in certain piconets, the devices on the piconet may "hop" to a different RF channel for receiving and transmitting communication packets every 625 microseconds. Thus, referring to the communications over the same physical channel does not imply that the same RF channel is used throughout the life of the piconet, rather merely that each device in the piconet may be configured to communicate over the same physical channel at any given time. These devices may be synchronized to a common clock and common hopping sequence based on the clock and other properties of a master device. All other synchronized devices in the piconet besides the master are referred to as slave devices, or slaves. The terms master and slave refer only to the roles of these devices with respect to their shared piconet, and need not reveal any information about the other functionality of these devices. For example, a desktop computer, wireless mouse, wireless keyboard, and mobile phone may all be connected in a single piconet. In such a piconet, the desktop computer need not be the master device, but may instead be a slave in the piconet while the mobile phone may act as the master device.

Within a common location, a number of independent piconets may exist. Each piconet may use a different physical communication channel at a given time, since each piconet will have a different master device with an independent piconet clock and piconet hopping sequence. The master's clock and hopping sequence may determine when, and to which physical RF channel, piconet transmissions will hop to next, and throughout the life of the picnonet. A collection of multiple independent and non-synchronized piconets is commonly referred to as a scatternet. A single device may participate concurrently in two or more piconets. In order to stay connected to the multiple piconets simultaneously, a device may use time-division multiplexing to alternate time slots between the physical channels of different piconet networks. A device cannot typically be a master of more than one piconet, since the piconet is defined by synchronization to the master device's clock. However, a device may be a slave in many independent piconets, and may be a master in one piconet while concurrently acting a slave in one or more other piconets. A single device connected to multiple piconets need not necessarily have network routing capability or function. In fact, for example, Bluetooth devices use core protocols which do not offer any network routing functionality.

Figure 3:
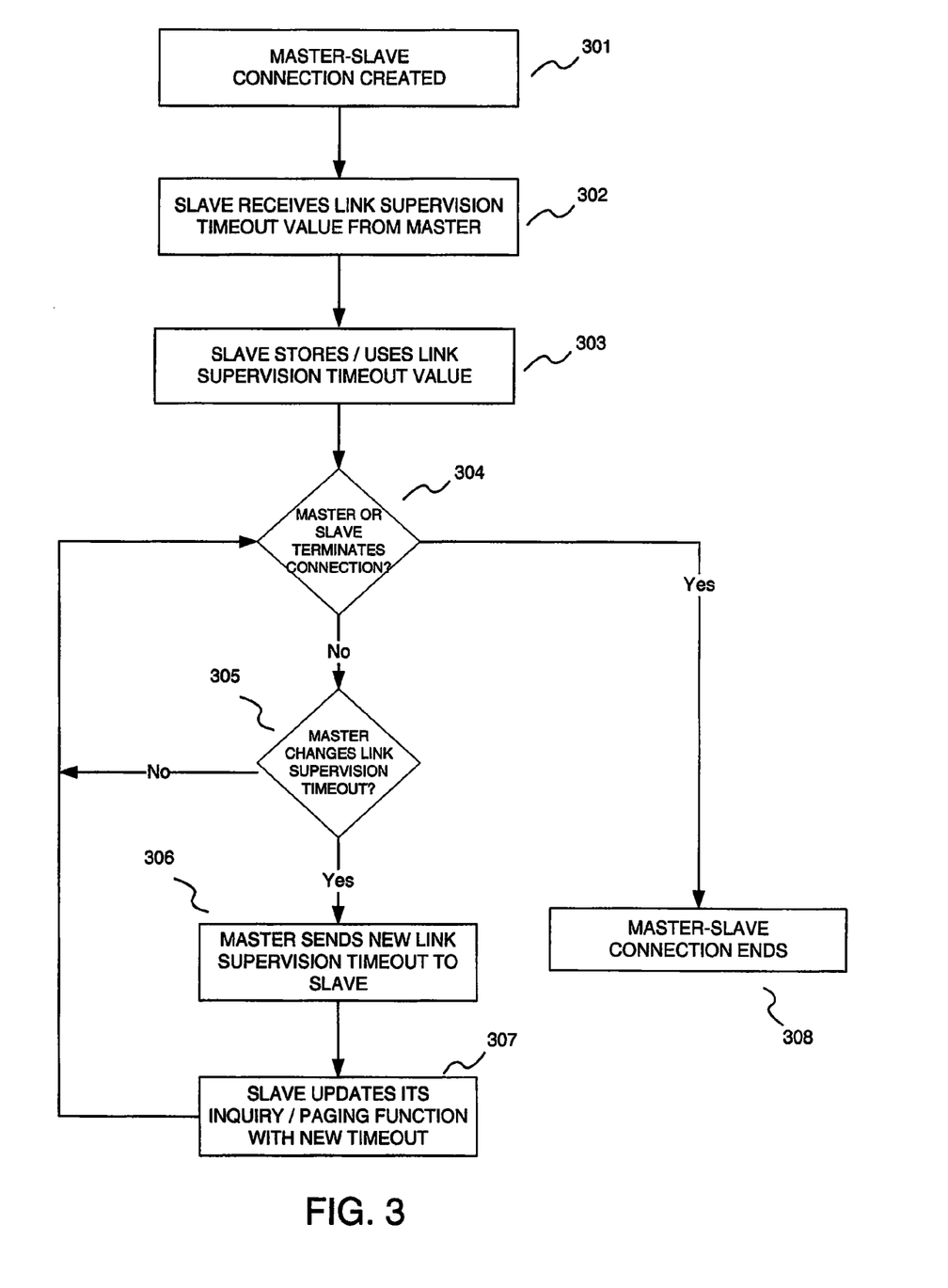
FIG. 3 is a flowchart showing illustrative steps for providing the link supervision timeout value to a slave device, in accordance with an embodiment of the present disclosure.

Referring to FIG. 3, a flow diagram is shown describing the communication of a link supervision timeout value between a master device and slave device in a piconet, in accordance with certain illustrative embodiments. Referring to step 301 in FIG. 3, a slave device connects to a master device in a piconet. This step may involve the creation of a new piconet which may initially include only these two devices. Alternatively, step 301 may involve a slave joining an existing piconet, for example, after being paged by a piconet master device. Such inquiry and paging processes are described in detail below.

Connected master and slave devices in a piconet may engage in polling to continuously evaluate the connection between the devices. During polling, the master device periodically (e.g., iteratively) transmits packets, for example, POLL or NULL packets as defined in the Bluetooth specification, to the slave device. The slave responds by sending NULL packets or DATA packets back to the master. This polling interval may be a short length of time and may be negotiated between the master and slaves devices on the piconet. The master may also send other packets, for example, DATA packets to the slave, either during the polling time slot for that slave at another time as determined by the master. At the completion of one successful polling cycle, or whenever both the master and slave have recently received a packet from the other, both may know that the connection between them is currently active and functional.

In step 302, the slave controller receives the link supervision timeout value from the piconet master. The link supervision timeout parameter relates to the polling done between a master and slave, and may be used by either party to monitor loss of contact between the two devices. During polling, the master may maintain an "out of contact" clock to measure the length of time since the slave and the master have last exchanged communication packets. When this length of time reaches the link supervision timeout value, the master may actively end its connection with the slave host, effectively removing the slave from the piconet. In other words, a master listening on the physical channel of its piconet may disconnect a slave host if the master has not received a baseband packet from the connection handle associated with the slave for a duration longer than the link supervision timeout.

In certain embodiments, the out of contact timer may begin counting from a time just after receiving the most recent data packet from the slave, and may be reset each time a new packet is received from the slave. Alternatively, the master's out of contact timer might not commence until shortly after the master sends a POLL or NULL packet to poll the slave.

In step 303, the slave stores the link supervision timeout value received from the master. This value may be stored at the slave controller, and may be communicated to the slave host so that the slave host may use the value to coordinate any actions which may potentially cause an interruption in the master-slave polling in the piconet. As an example, the slave host may receive an HCI Connection_Complete event, as defined in the Bluetooth Specification, from the slave controller, to notify the slave host that a connection has been successfully created with a master device. Upon receiving this event, the slave host may then retrieve the link supervision timeout from the slave controller with a Read_Link_Supervision_Timeout command. Once the slave host is aware of the link supervision timeout value, it may use this value to coordinate the execution of network-related tasks, such as, for example, Bluetooth inquiry or paging procedures, which are discussed in detail below.

Although several illustrative embodiments describe slave coordination of subsequent inquiry and paging procedure, the slave may also use the link supervision timeout value while performing tasks unrelated to inquiry and paging. For example, system or network maintenance performed by the slave may result in a temporary disruption of the master-slave polling. Awareness by the slave of the master's link supervision timeout value may allow the slave to manage such maintenance to potentially avoid a costly timeout connection loss. Additionally, the slave device may choose not to use the exact link supervision timeout value in these and other tasks, but may determine a value somewhat smaller than the received link supervision timeout value. By choosing a value less than the link supervision timeout value, the slave host may allow itself enough time to complete a desired task and then resume polling behavior with the piconet master before the link supervision timeout period has elapsed and the master-slave connection is severed.

In step 304, the slave is connected to the piconet through the master device and the polling behavior between the two may continue relatively uninterrupted. That is, in this example, step 304 represents a period during which the link supervision timeout period will not be reached, and the connection between the master and slave ends if terminated intentionally by one of the parties. If the master or slave does terminate this link, the connection between the devices ends at step 308, and the slave is no longer a member of the piconet.

In step 305, the piconet master may change the link supervision timeout value for the piconet. The master may be free to change this value at any time during the life of the piconet, and each master-slave connection may have its own link supervision timeout. If the master changes the link supervision timeout value for a master-slave connection in step 305, then the master controller may send this new link supervision timeout value to the slave controller in step 306. In step 307, the slave stores the new link supervision timeout value. Step 307 may include the slave controller sending an HCI event to the slave host to notify the slave host that a new link supervision timeout has been set for the master-slave connection. The slave may then update its behavior with respect to subsequent network-related activities in order to avoid undesirable timeout connection losses. For example, if the slave host is notified that the master has increased the link supervision timeout value on the piconet, the slave host may accordingly issue an HCI Write_Page_Timeout command to the slave controller, to increase the timeout value for future Bluetooth paging procedures, to reflect this longer link supervision timeout period of the master-slave connection.

In one example, the controller at the master source may communicate the new link supervision timeout value to the slave controller in a link management protocol (LMP) message. Then, as mentioned above, the slave controller may notify a slave host of the change in link supervision timeout through an HCI event. For example, an HCI Link_Supervision_Changed event may be implemented as an extension to a Bluetooth Core 2.0+EDR compliant wireless network. The event parameters for this HCI event sent by the slave controller may include the new link supervision timeout value, allowing the slave host to extract and store this value, then to use it. Alternatively, the new link supervision timeout value need not be included as an event parameter. Rather, upon receiving an HCI Link_Supervision_Changed event, the slave host may then issue an HCI Read_Link_Supervision_Timeout command to learn the new value. The aforementioned potential advantages result in either case, as the slave host might not need to consult the slave controller each time before performing a network-related task, and thus does not incur additional risk of an undesirable timeout connection loss when performing such a task.

After receiving the new link supervision timeout value from the master in step 306 and storing the new value in step 307, the slave may now continue polling with the master in step 304, at the same previous polling interval or a new polling interval determined by the parties. Note that the master-slave polling behavior described above need not stop during the executing of steps 305-307, but may continue uninterrupted while separate communications may be used notify the slave of the change in the link supervision timeout value. Additionally, as is shown in FIG. 3, the master may change the link supervision timeout value frequently, and each time the slave receives and stores the updated value.

Figure 4:
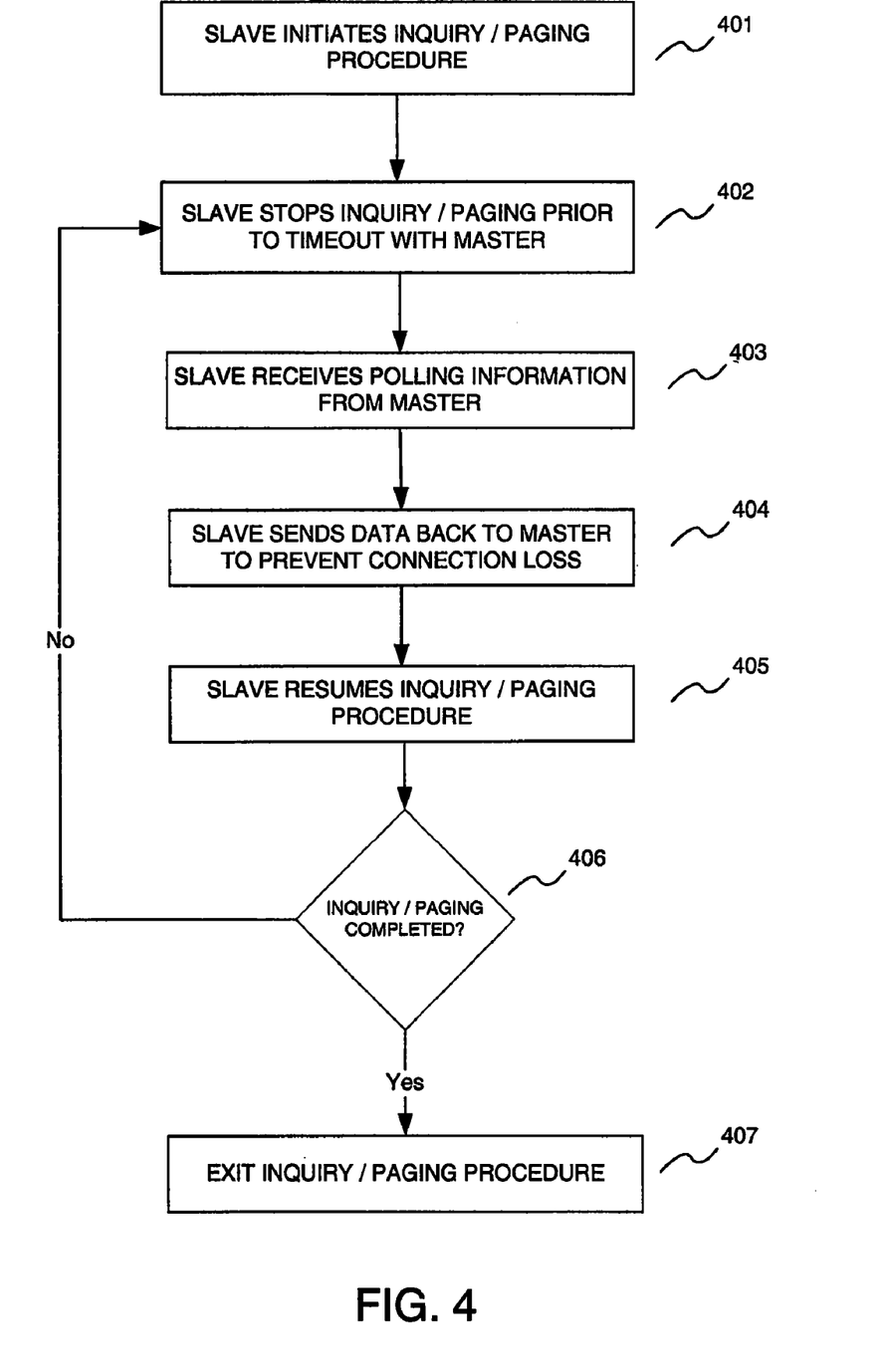
FIG. 4 is a flowchart showing illustrative steps for performing an inquiry or paging task, as a slave device in a piconet, in accordance with an embodiment of the present disclosure.

Referring to FIG. 4, a flow diagram is shown describing a method for a slave device to perform an inquiry or paging task while remaining in a piconet, in accordance with certain illustrative embodiments. In step 401, a slave in a piconet begins an inquiry or paging procedure with a device outside of its existing piconet. As mentioned above, devices in a piconet may commonly interact with other nearby devices outside of their piconet, and may even form or join other piconets as part of a broader scatternet network. As an example, a Bluetooth-enabled device may use the inquiry procedure, as described in the Bluetooth specification, to discover other Bluetooth-enabled devices in their locality. This inquiry procedure may be asymmetrical. A Bluetooth-enabled device that tries to find other nearby devices may be known as an inquiring device and may actively send inquiry requests. Bluetooth-enabled devices that are available to be found may be known as discoverable devices, which may listen for and respond to these inquiry requests. As is described in the Bluetooth specification, the inquiry procedure uses a special physical channel for the inquiry requests and responses from the communicating devices. Since a slave host might not be able to monitor the activity of two different piconets simultaneously, a slave performing inquiry requests or responses may be unable to listen or respond to its existing piconet master, which is communicating on a different physical channel. Thus, during an inquiry procedure or similar network-related activity, the master-slave polling in a piconet may be disrupted, and a slave device may temporarily lose contact with its piconet master.

Continuing with step 401, once the slave has discovered, or been discovered by, another nearby device, the slave may connect to this other device to form or join an additional piconet. For example, according to the Bluetooth specification, an asymmetrical paging procedure is used for forming connections. This paging procedure requires that one Bluetooth-enabled device carry out the page, or connection, procedure, while the other Bluetooth-enabled device performs page scanning to remain connectable. The paging procedure may be targeted to a specific device, so that the paging device may select an individual device to connect to, for instance, when multiple devices are discovered during the inquiry procedure. As with the inquiry procedure, during paging, the connectable device uses a special physical channel to listen for connection request packets from the paging device. This physical channel has attributes that are specific to the connectable device, hence only a paging device with knowledge of the connectable device is able to communicate on this channel. Since both the paging and connectable devices may already be connected to other devices in an existing piconet, the paging procedure may similarly disrupt piconet polling, and temporarily cause a loss of contact between master and slave devices.

Step 401 may include an inquiry procedure, a paging procedure, or a combination of the two, since an inquiry may be immediately followed by paging in order to quickly find and create a new connection. However, while the examples shown in FIGS. 3 and 4 illustrate a slave device performing inquiry or paging functions, the present disclosure is not limited as such. Any task or network interruption which may temporarily interfere with communications between the master and slave in a piconet may be adaptable to the illustrative embodiments described herein. For example, a slave device may require system maintenance, such as the performance of self-diagnostic functions, which may temporarily render the slave unavailable to the master device. In such a situation, the slave device may alter its normal schedule of self-diagnostic functions to adapt to the link supervision timeout, as described above, in order to maintain its connection with the master device. Thus, using the illustrative embodiments described herein, a slave device may potentially remain on a piconet while performing system and network maintenance tasks which might otherwise require a timeout connection loss followed by a reconnection to the same piconet master.

In step 402, if the inquiry or paging procedure from step 401 has not yet completed, the slave device may stop this procedure. This procedure may be stopped at a predetermined activity time based on the link supervision timeout value of the piconet. The predetermined activity time may be smaller than the link supervision timeout, so that the execution of a procedure will never, by itself, exceed the timeout period for a master-slave link. In certain embodiments, a procedure might not be completely terminated, but rather suspended by storing certain state information regarding the execution of the procedure. Such embodiments may allow the procedure to be subsequently restarted from the point in the execution where it was stopped. For example, an inquiry procedure may be split into smaller time slices of inquiry, so that the inquiry may complete in its entirety, and with no one section of the inquiry execution lasting longer than the link supervision timeout period. Similarly, the paging procedure may be restricted to execute in a time shorter than the link supervision timeout period, in avoid a timeout connection loss between the master-slave in the existing piconet.

In step 403, the slave, which has resumed listening on the physical channel of its existing piconet, receives a packet from the master device. The slave may now reply by sending a NULL or DATA packet back to the piconet master in step 404. The master, upon receiving this packet from the slave, may then reset the timeout clock for this slave, thus preventing a timeout connection loss for at least the duration of another link supervision timeout period. In step 405, the slave host, having averted a timeout connection loss, may once again go offline from the master device to continue the inquiry or paging procedure that was started in step 401. This process continues at step 406 until the slave's timeout clock once again approaches the link supervision timeout value, in which case the slave returns to step 402 to reestablish communication with the piconet master in order to reset the timeout clock associated with the slave. This circular process may continue until the inquiry or paging procedure has completed and exited at step 407, at which time the slave may return to the physical channel of the piconet for continued polling with the master device.

Figure 5:
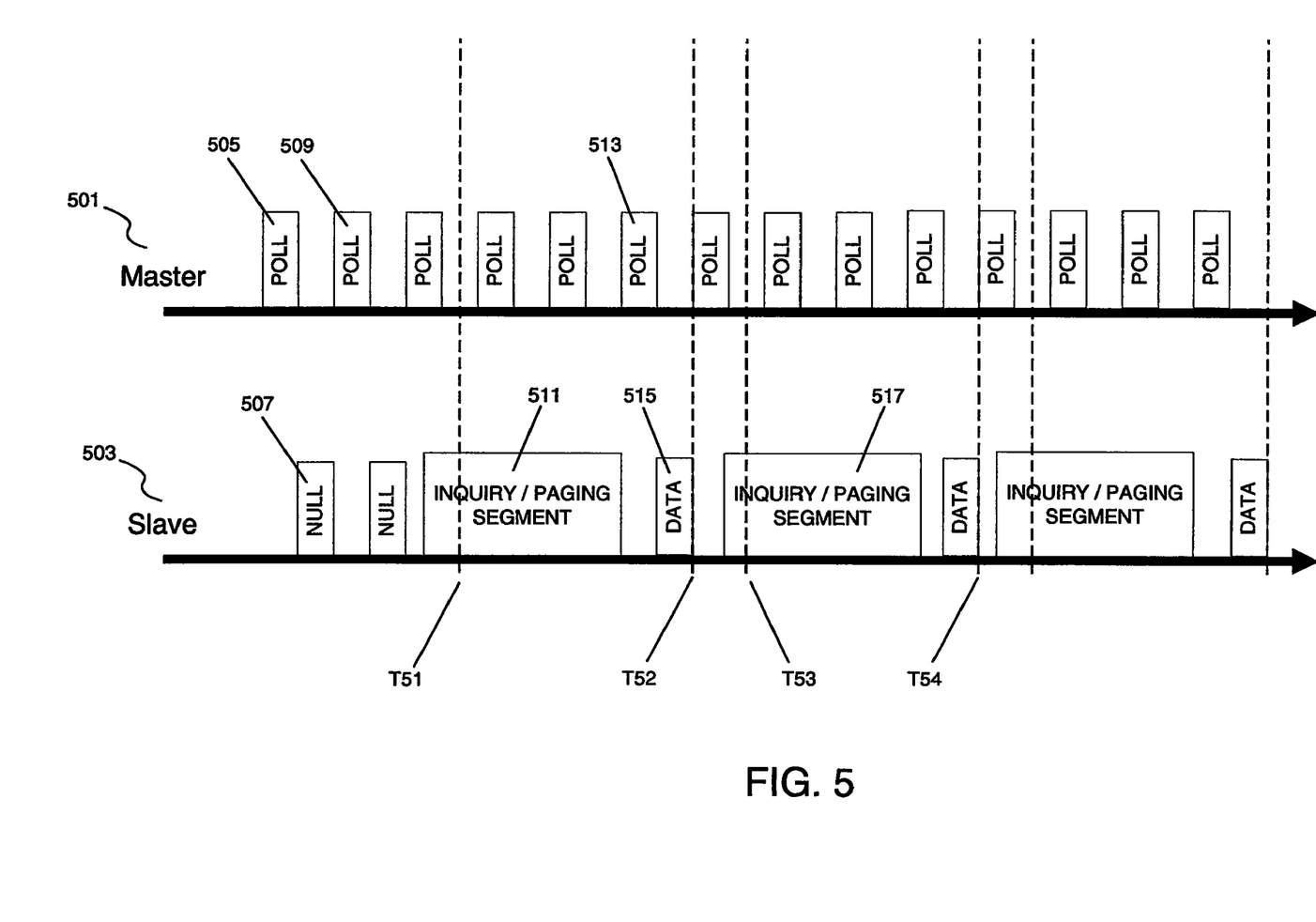
FIG. 5 is a block diagram showing an illustrative method of interaction between a master and slave device, in accordance with an embodiment of the present disclosure.

Referring to FIG. 5, a block diagram is shown illustrating the performance of an inquiry or paging procedure, by a slave device in a piconet, in accordance with certain illustrative embodiments. The example shown in FIG. 5 may correspond to the execution of the same inquiry/paging procedure described in the flow diagram of FIG. 4. As in FIG. 1, the horizontal lines represent the progression of time for the master device 501 and the slave device 503 from left to right. Prior to the initiation of an inquiry or paging procedure, the master device 501 sends a polling packet 505 to the slave device 503. In this example, the slave 503 is listening on the physical channel associated with this piconet, as determined by the master device 501. Therefore, the slave 503 receives POLL packet 505 and replies to the master 501 with the NULL packet 507. The master 501 then receives this NULL packet 507 from the slave 503, so it need not start the out of contact clock, or timeout clock, for the slave 503 at this time. Instead, the master 501 may simply wait until the next determined polling interval, and then send another POLL packet 509 to the slave 503. The POLL packet 509 may be identical to the POLL packet 505, or it may contain slightly different data, for instance, time stamp data that varies with each packet sent.

In this example, this synchronized polling behavior between the master 501 and the slave 503 continues until the slave initiates the inquiry or paging procedure 511. This step, which may correspond to step 401 of the flow diagram described in FIG. 4, may interrupt the periodic or iterative polling between the master 501 and slave 503, causing the master 501 to start a timeout clock for this slave 503 at time T51, shortly after the master 501 fails to receive a timely response to a POLL packet. In other embodiments, the master 501 may restart this timeout clock each time it sends a POLL packet to the slave 503, and reset this clock with each response packet received from the slave 503.

As shown in FIG. 5, a slave 503 executing an inquiry or paging procedure 511 may fail to respond to several consecutive POLL packets sent by the master 501. In this example, the master 501 continues to send POLL packets at the same polling interval even if the slave 503 is no longer responding. Then, as described above in relation to step 402 of FIG. 4, the slave 503 makes a determination to stop the inquiry or paging procedure 511 before exceeding the master's link supervision timeout duration and subsequently being disconnected from the piconet. Accordingly, the slave 503 may terminate the procedure, or simply suspend the execution of the procedure 511, and resume listening on the physical channel of the piconet. Then the slave 503, which has returned to the physical channel of the piconet, may now receive POLL packet 513 from the master 501, and reply with DATA packet 515. The master 501, upon receiving DATA packet 515, may then stop and reset the timeout clock associated with slave 503 at time T52. The slave 503 may now resume the inquiry or paging procedure with a new procedure segment 517, which may continue for a length of time somewhat less than the link supervision timeout value of the piconet. When the slave 503 resumes the procedure 517, the master 501 may once again start the slave's 503 timeout clock at time T53. The slave 503 may subsequently return to the physical channel of the piconet, prompting the master 501 to stop and reset the slave's 503 timeout clock at time T54. This process may continue until the slave 503 has completed the final inquiry or paging procedure segment (not shown).

As is further shown in FIG. 5, the slave may send DATA packets to the master when reestablishing contact after a short period of no contact between the two devices, and the master may respond with a POLL packet. However, the slave need not send DATA packets to reestablish contact and reset the timeout clock, but may send NULL packets instead. Further, the master need not send POLL packets in the first transmission after receiving a packet from the slave following a period of no contact, but may instead send DATA packets. When the slave and/or master sends a DATA packet, an HCI event may notify the host of the receiver of the DATA packet. In contrast, the host of a receiver of a NULL packet may not be notified by an HCI event. Further, a slave device sending a DATA packet may receive an acknowledgment packet from the master device, allowing the slave to know that master has received this packet and the link supervision timeout clock will be reset. In contrast, a slave device sending a NULL packet to a master device might not receive an acknowledgment packet from the master, and will therefore not be able to confirm that the master received the packet and will reset the link supervision timeout clock. Thus, in this example, DATA packets may be used rather than NULL or POLL packets to permit the slave host and master host to better coordinate the network-related tasks to avoid undesirable timeout connection loses. In contrast, NULL or POLL packets may be used reestablishing master-slave communication, in situations when the slave controller and master controller might be responsible for coordinating the network-related tasks to avoid undesirable timeout connection losses.

Figure 6:
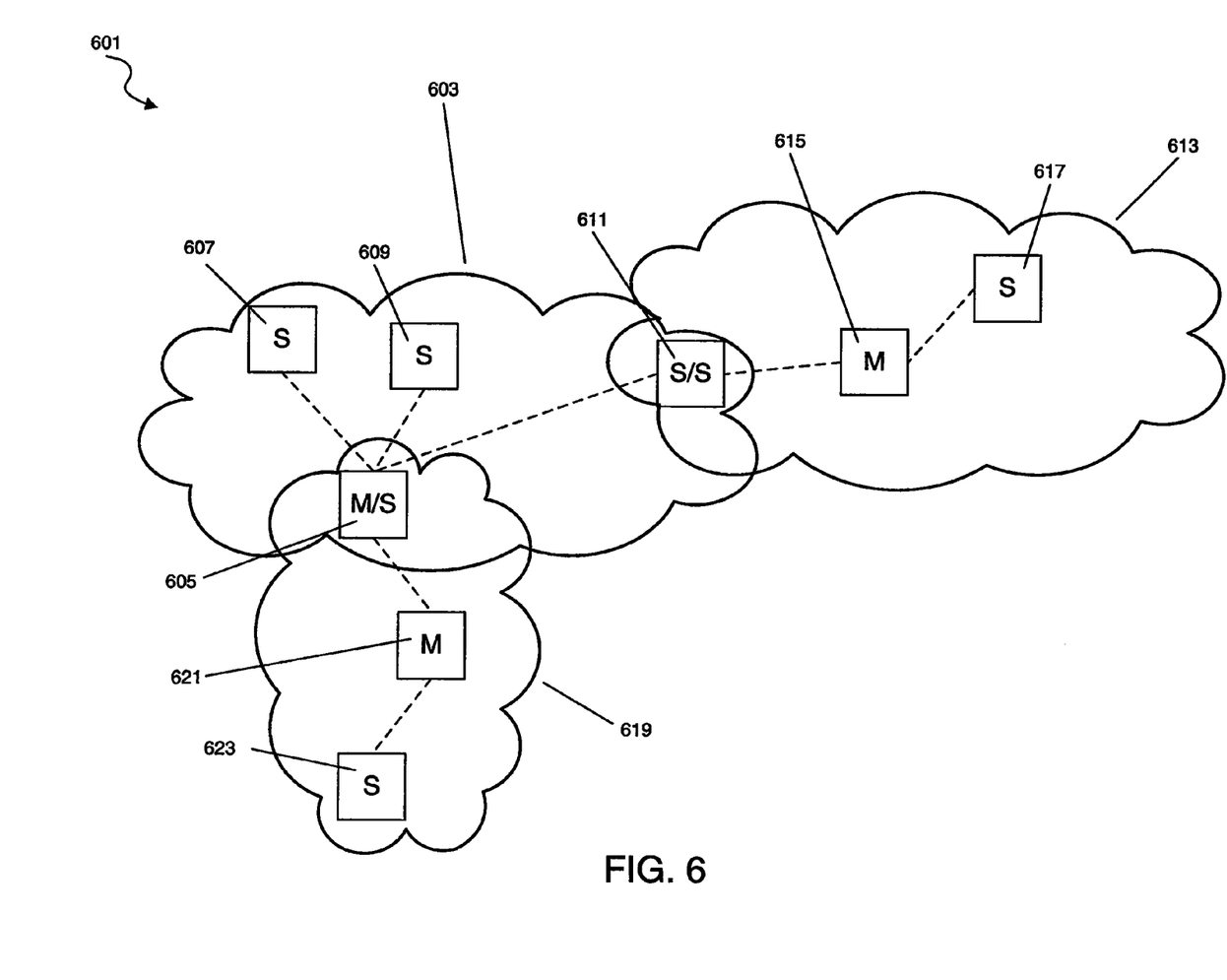
FIG. 6 is a block diagram showing an illustrative embodiment of a scatternet wireless network, in accordance with an embodiment of the present disclosure.

Referring to FIG. 6, a block diagram is shown illustrating multiple devices configured in a scatternet wireless network, in accordance with certain illustrative embodiments. In this example, the scatternet 601 includes three piconets 603, 613, and 619. The piconet 603 has a master device 605, and three slave devices 607, 609, and 611. The piconet 613 has a master device 615, and two slave devices 611 and 617. The piconet 619 has a master device 621, and two slave devices 605 and 623. Note in particular, as described above, that a single device may be a member of multiple piconets and the same time, for instance, through the Bluetooth inquiry and paging procedures described above. For example, device 611 is a slave in piconet 603 and a slave in piconet 613. As another example, device 605 is the master of piconet 603, and is also a slave in piconet 619. Either device 605 or 611 may have resulting from programming on those devices to execute steps similar to those described above in relation to FIG. 4. Such programming steps, as disclosed herein, may allow a device to search for and form/join a piconet while already a member of one or more existing piconets.

While the foregoing descriptions and the associated drawings may relate to communication between a master and a slave device within a piconet, many modifications and other embodiments will come to mind to one skilled in the art having the benefit of the teachings presented. Thus, the illustrative embodiments described herein may be adaptable to any network which supports connection among multiple devices.

What is claimed is:

1. A method comprising:
    receiving at a slave device a link supervision timeout value from a master device in a piconet;
    determining that an execution time of a network-related task to be performed by the slave device exceeds a duration of time corresponding to the link supervision timeout value received from the master device;
    dividing the network-related task into segments, wherein each segment is executable within the duration of time corresponding to the link supervision timeout value; and
    executing a first segment of the network-related task.

2. The method of claim 1, wherein said executing comprises executing said first segment of the network-related task by a Bluetooth-enabled wireless device assuming the role of a slave device in said piconet.

3. The method of claim 1, wherein said receiving the link supervision timeout value comprises receiving a link management protocol command from said master device.

4. The method of claim 1, wherein said network-related task comprises a paging procedure.

5. The method of claim 1, wherein said network-related task comprises an inquiry procedure.

6. The method of claim 1, further comprising executing remaining segments of the network-related task, wherein each said remaining segment is executed in a period of time shorter than the link supervision timeout value.

7. The method of claim 6, further comprising sending a communication packet to the master device between the execution of any two sequentially executed segments.

8. The method of claim 7, wherein the sending comprises sending a null packet in response to a poll packet received from the master device.

9. The method of claim 7, wherein the sending comprises sending a data packet to the master device and receiving an acknowledgment from the master device, said acknowledgment indicating that the master device received said data packet.

10. Apparatus comprising:
a slave host; and
a slave controller configured to perform a method comprising:
  receiving a link supervision timeout value from a master device;
  storing said link supervision timeout value; and
  sending said link supervision timeout value to the slave host, in response to receiving said link supervision timeout value,
  wherein, in response to receiving said link supervision timeout value, said apparatus is configured to:
    determining that an execution time of a network-related task to be performed by the apparatus exceeds a duration of time corresponding to the link supervision timeout value; and
    execute the network-related task divided in segments, wherein each segment is executed in a length of time less than the link supervision timeout value.

11. The apparatus of claim 10, wherein said apparatus comprises a Bluetooth-enabled wireless device in a piconet.

12. The apparatus of claim 10, wherein said network-related task comprises one of a paging procedure and an inquiry procedure.

13. The apparatus of claim 10, wherein said slave controller is further configured to communicate with the master device between the execution of each said segment, said communicating comprising sending a communication packet to the master device and receiving an acknowledgment from the master device indicating that a link supervision timeout clock maintained at the master device and associated with the apparatus has been reset.

14. An apparatus, comprising:
integrated circuitry configured to receive a link supervision timeout value from a master device;
integrated circuitry configured to store said link supervision timeout value;
integrated circuitry configured to receive a network-related task from a slave host;
integrated circuitry configured to partition said network-related task into one or more segmented tasks, wherein the expected execution time of each segmented task is less than said link supervision timeout value; and
integrated circuitry configured to execute the one or more segmented tasks sequentially.

15. The apparatus of claim 14, wherein the apparatus comprises a Bluetooth-compatible application specific integrated circuit.

16. The apparatus of claim 14, wherein the network-related task received from the slave host comprises one of an inquiry procedure and a paging procedure.

17. The apparatus of claim 14, wherein the integrated circuitry configured to execute the one or more segmented tasks sequentially is further configured to communicate with the master device between the execution of each segmented task.

18. The method of claim 1, wherein the link supervision timeout value corresponds to a duration of time.

19. The method of claim 18, further comprising:
receiving from the master device a second link supervision timeout value corresponding to a different duration of time than the link supervision timeout value;
dividing a second network-related task into execution segments based on the second link supervision timeout value; and
executing one or more of the execution segments of the second network-related task.

20. The apparatus of claim 10, wherein the link supervision timeout value corresponds to a duration of time.

21. The apparatus of claim 20, wherein the slave controller is further configured to receive from the master device a second link supervision timeout value corresponding to a different duration of time than the link supervision timeout value, and
wherein said apparatus is configured to divide a second network-related task into execution segments based on the second link supervision timeout value, and to execute one or more of the execution segments of the second network-related task.

22. An apparatus comprising:
means for receiving a link supervision timeout value from a master device in a piconet;
means for determining that an execution time of a network-related task to be performed exceeds a duration of time corresponding to the link supervision timeout value received from the master device;
means for dividing the network-related task into segments, wherein each segment is executable within the duration of time corresponding to the link supervision timeout value; and
means for executing a first segment of the network-related task.

* * * * *